(12) United States Patent
Bonk et al.

(10) Patent No.: US 6,296,311 B1
(45) Date of Patent: Oct. 2, 2001

(54) CONSTANT ENGAGEMENT INFINITE RECLINER

(75) Inventors: Jeffery T. Bonk, Clinton Township; Craig J. Coughlin, Shelby, both of MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/430,593

(22) Filed: Oct. 29, 1999

(51) Int. Cl.⁷ ....................................................... B60N 2/02
(52) U.S. Cl. ............................................................ 297/367
(58) Field of Search ...................................... 297/366, 367, 297/368, 369, 362

(56) References Cited

U.S. PATENT DOCUMENTS

| | | |
|---|---|---|
| 4,211,451 | 7/1980 | Shephard . |
| 4,299,316 | 11/1981 | Reinmoeller . |
| 4,371,207 | 2/1983 | Wilking et al. . |
| 4,591,207 | 5/1986 | Nithammer et al. . |
| 4,884,845 | 12/1989 | Schmale et al. . |
| 4,946,223 | 8/1990 | Croft et al. . |
| 5,005,906 | 4/1991 | Suzuki et al. . |
| 5,090,771 | 2/1992 | Kawakita . |
| 5,154,475 | 10/1992 | Kafitz . |
| 5,531,504 | 7/1996 | Schmale et al. . |
| 5,553,922 | 9/1996 | Yamada . |
| 5,881,854 | 3/1999 | Rougnon-Glasson . |
| 5,882,080 | * 3/1999 | Houghtaling et al. . |

* cited by examiner

Primary Examiner—Milton Nelson, Jr.
(74) Attorney, Agent, or Firm—Harness, Dickey & Pierce, P.L.C.

(57) ABSTRACT

A constant engagement infinite recliner adapted for use with a hinge assembly such as in a vehicle seat is disclosed that is operable to prevent relative rotation between first and second hinge members when the locking assembly is in its neutral mode, to allow relative rotation of the hinge members in a first direction and prevent rotation in a second direction when the locking assembly is in a first adjusting mode, and to allow relative rotation in a second direction yet prevent rotation in the first direction when the locking assembly is operated in a second adjusting mode.

30 Claims, 6 Drawing Sheets

CONSTANT ENGAGEMENT INFINITE RECLINER

BACKGROUND OF THE INVENTION

1. Technical Field

The present invention relates generally to hinge mechanisms for controlling the pivotal movement of a seatback relative to a seat bottom and, more particularly, to a seat with a hinge having a constant engagement reclining mechanism.

2. Discussion

Numerous hinge mechanisms are generally known in the art for selectively adjusting the angular position of a seatback relative to a seat bottom. Many of these mechanisms include latches that are selectively movable by the operator from a first position fixing the angular position of the seatback relative to the seat bottom to a second position wherein the seatback is adjustable relative to the seat bottom. Some of these latch mechanisms include constant engagement and/or infinite recline position features wherein the latching assembly prevents undesirable movement of the seatback relative to the seat bottom. Such latching mechanisms may also be operable in reclining modes where actuation of a handle in a first direction pivots the seatback in a corresponding direction while actuation of the handle in a second direction pivots the seatback in an opposite direction.

While the aforementioned constant engagement infinite recliners generally operate in a satisfactory manner to achieve their intended results, the need remains for a constant engagement infinite recliner that can be efficiently manufactured, is durable, and provides long-lasting performance.

SUMMARY OF THE INVENTION

Accordingly, it is an object of the invention to provide a hinge assembly for use in a vehicle seat wherein the hinge assembly includes a constant engagement infinite recliner.

A further object of the present invention is to provide a constant engagement infinite recliner assembly that prevents unexpected and/or undesirable movement of a second hinge member relative to a first hinge member.

Still another object of the present invention is to provide a constant engagement infinite recliner assembly having a locking assembly that allows rotation of the second hinge member relative to the first hinge member in a first direction while preventing such rotation in a second direction.

A still further object of the present invention is to provide a constant engagement infinite recliner assembly having the above features that can be efficiently manufactured, is durable, and provides long-lasting performance.

These and other objects are obtained by providing a hinge assembly for use with a seat having a seat back and a seat bottom. The hinge assembly includes a first hinge member adapted to be connected to one of the seat back and the seat bottom and having a cylindrical bearing surface that defines a cavity. The hinge assembly also includes a second hinge member adapted to be connected to the other of the seat back and seat bottom as well as to the first hinge member for rotation relative thereof. Finally, the hinge assembly includes a reclining mechanism including a hub fixed for rotation with the second hinge member, a locking assembly, a handle, a drum, and a spring. The locking assembly is operable in a neutral mode to prevent rotation of the hub relative to the first hinge member, a first adjusting mode to allow rotation of the hub relative to the first hinge member in a first direction while preventing rotation of the hub relative to the first hinge member opposite the first direction, and a second adjusting mode allowing rotation of the hub relative to the first member in a second direction while preventing rotation of the hub relative to the first hinge member in the first direction. The handle is coupled to the first hinge member for movement between a neutral position, a recline actuated position, and an upright actuated position. The drum is rotatable relative to the first and second hinge members and operatively coupled to the handle and the locking assembly to move the locking assembly into the first adjusting mode when the handle is moved into its recline actuated position and into the second adjusting mode when the handle is moved into the upright position. The spring biases the handle into its neutral position.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

DETAILED DESCRIPTION OF THE DRAWINGS

The present invention will become more fully understood from the detailed description given hereinafter and the accompanying drawings in which.

DETAILED DESCRIPTION OF THE PREFERRED EMBODIMENT

The present invention generally provides a hinge assembly for use as a constant engagement infinite recliner and, more particularly, to selectively adjust the angular position of the seatback relative to the seat bottom. The constant engagement feature of the seat hinge assembly prevents unexpected and/or undesired movement of the seatback relative to the seat bottom when the operator is adjusting the angular position of the seatback. Moreover, the infinite adjustment feature allows the occupant to fix the seatback in an infinite number of angular positions relative to the seat bottom.

Figure 1:
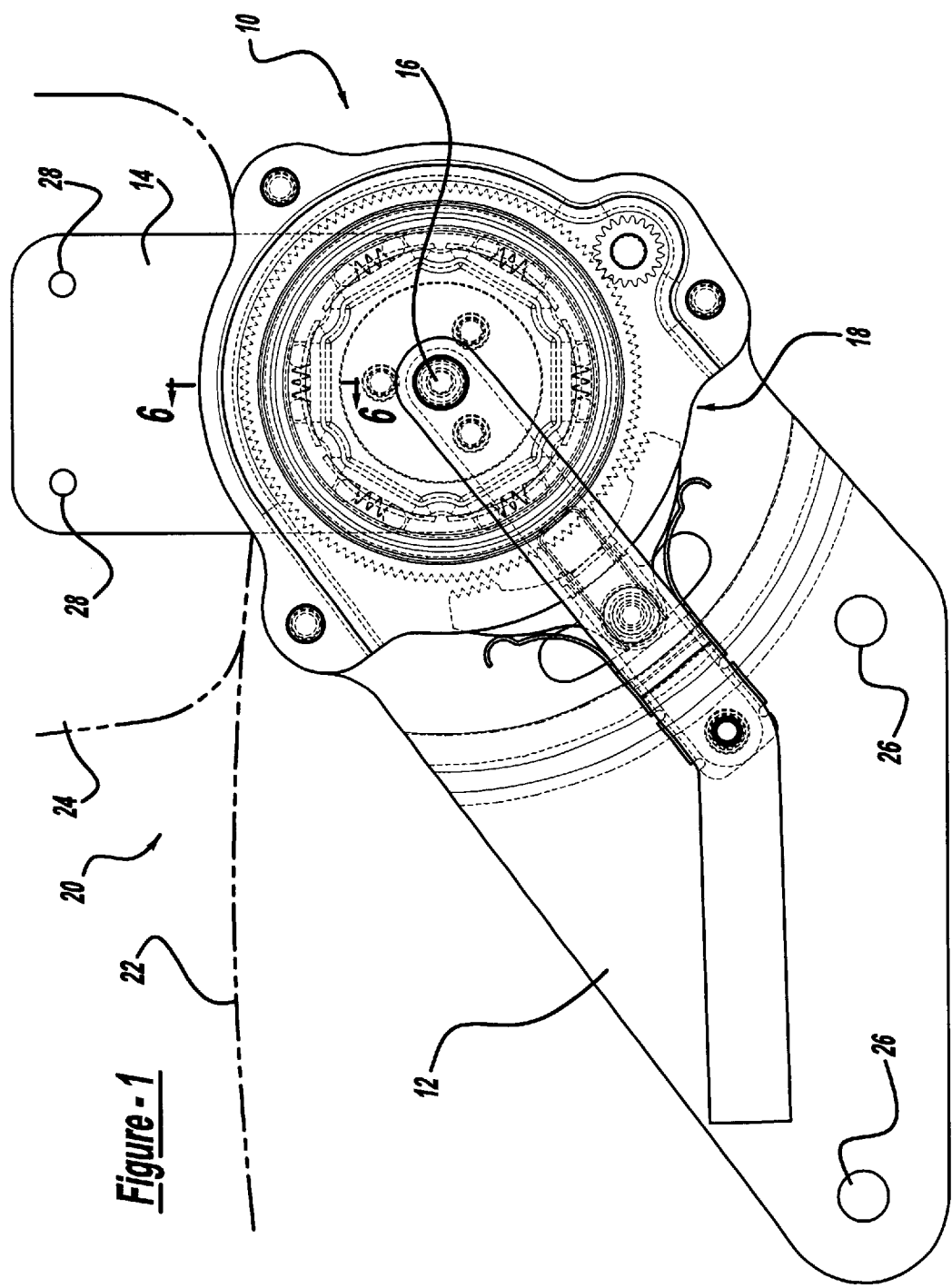
FIG. 1 is a partial side elevational view of the seat having a seat hinge assembly according to the present invention.

Referring in particular to the drawings, FIGS. 1–8 show a hinge assembly that includes a first hinge member 12, a second hinge member 14 coupled to the first hinge member for rotation about a pivot 16 in a first direction indicated by arrow "A" and a second direction opposite arrow "A", and a constant engagement infinite recliner mechanism 18 coupled to the first and second hinge members for selectively adjusting their relative angular positions as hereinafter described. Hinge assembly 10 is illustrated in FIG. 1 as being incorporated into a vehicle seat 20 having a seat bottom 22 and a seatback 24 wherein the first hinge member 12 is coupled to the seat bottom in a manner generally known in the art such as via bolts disposed in apertures 26 and the second hinge member 14 is coupled for rotation with the seatback also in a manner generally known in the art such as via bolts disposed in apertures 28. Thus, in the illustrated application, the seatback 24 rotates with second hinge member 14 while first hinge member 12 is fixed with the seat bottom.

Figure 2:
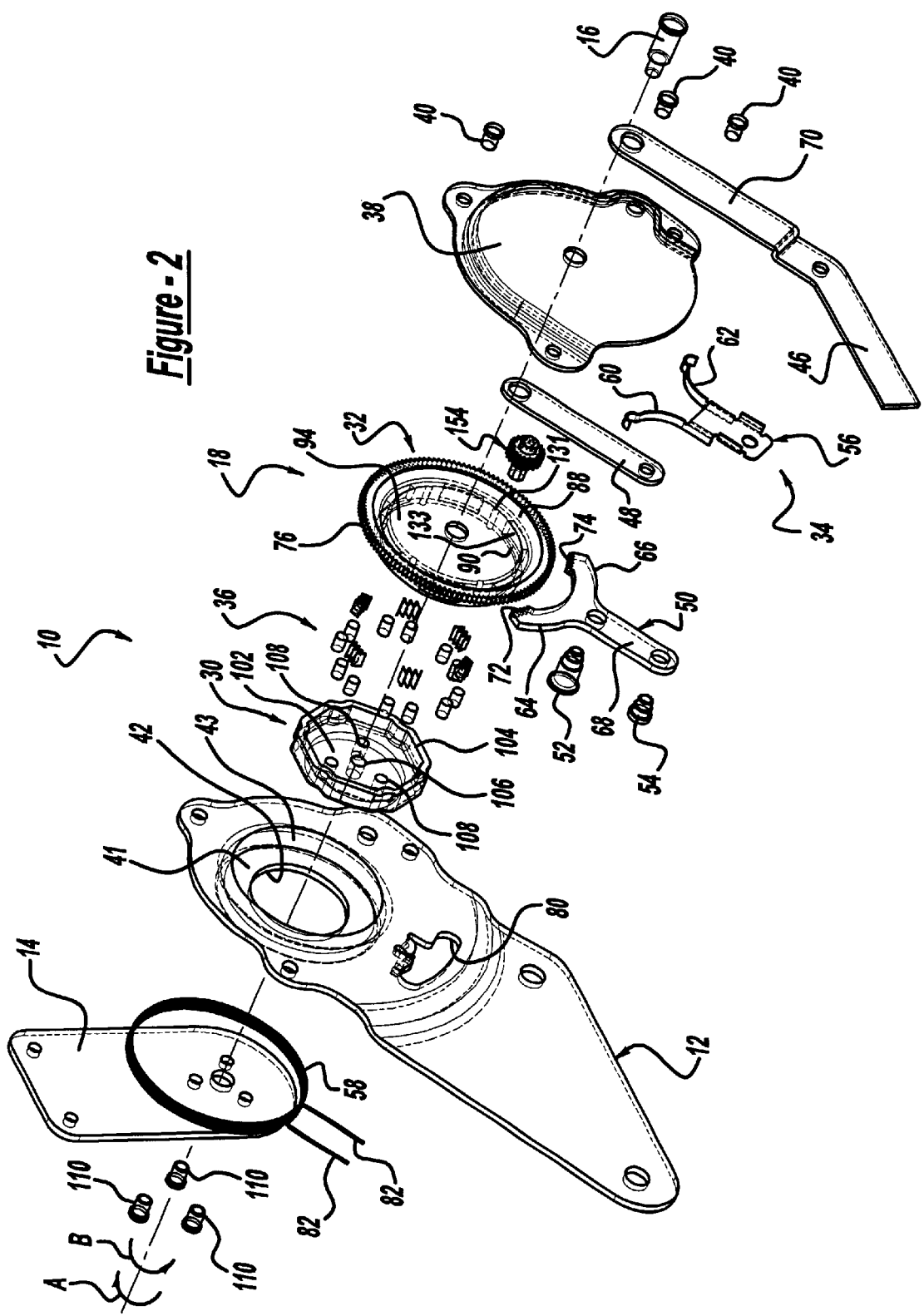
FIG. 2 is an exploded perspective view of the seat hinge assembly illustrated in FIG. 1.

As is more clearly illustrated in FIG. 2, constant engagement infinite recliner mechanism 18 generally includes a hub 30 fixed for rotation with second hinge member 14, a drum 32 coupled to second hinge member 14 for rotation relative to the first and second hinge members about pivot 16, a cover plate 38, an actuator assembly 34 for selectively rotating drum 32, and a locking assembly generally indicated by reference numeral 36. As is described in greater detail below, the locking assembly 36 is normally operable in a neutral mode to prevent rotation of the hub 30 in the first and second directions indicated by arrows "A" and "B", respectively, a first adjusting mode wherein the locking assembly allows rotation of the hub in the first direction and prevents rotation in the second direction (FIG. 3), and a second adjusting mode wherein the locking assembly allows rotation of the hub, and therefore the second hinge member 14, in the second direction while preventing rotation of the hub in the first direction (FIG. 4). As noted above, hinge assembly 10 also includes a cover plate 38 that is connectable to first hinge member 12 such as via rivets 40 to enclose the hub, drum, and locking assembly within a protected cavity.

Drum 32 is selectively rotatable by an operator through manipulation of actuator assembly 34 which, in the illustrated embodiment, includes a handle 46 and link 48 each coupled for rotation about main pivot 16, a pawl lever 50 pivotably coupled to a second end of link 48 via pin 52 and to handle 46 by an outer pin 54, a pawl spring 56, and a handle spring 58. Pawl spring 56 is coupled to pawl lever 50 and handle 46 by outer pin 54 and includes first and second legs 60 and 62, respectively. When pawl spring 56 is coupled to pawl lever 50 and handle lever 46 (FIGS. 1, 3 and 4), first and second legs 60 and 62 engage upper and lower arcuate surfaces 64 and 66 to bias the handle assembly into its neutral position (FIG. 1) wherein the link 48, pawl lever finger 68, and inner segment 70 of handle 46 are aligned.

Pawl lever 50 further includes first and second toothed segments 72 and 74 that are configured to engage a toothed ring 76 of drum 32. More particularly, when an operator rotates handle 46 in the first direction indicated by arrow "A", such movement is conveyed to pawl lever 50 through outer pin 54 to rotate the pawl lever about pin 52 whereupon when the handle 46 reaches its recline actuated position (FIG. 3) and the first toothed segment 72 engages the cooperatively toothed ring 76 circumscribing drum 32. Similarly, rotation of handle 46 in the second direction indicated by arrow "B" rotates pawl lever 50 about pin 52 until second toothed segment 74 engages ring 76 when the handle is in its upright actuated position (FIG. 4). Further movement of the handle beyond the illustrated recline and upright actuated positions causes rotation of drum 32 about main pivot 16. Again, pawl spring 56 is configured and assembled in the manner described above so as to bias the handle 46 into its neutral position (FIG. 1) wherein both the first and second toothed segments of pawl lever 50 are operatively disengaged from ring 76.

It should be appreciated that while actuator assembly 34 is illustrated and described herein as a mechanical device manipulatable directly by the seat occupant, various other actuators generally known in the art may be used to selectively rotate pawl lever 50 about pin 52 and selectively rotate drum 32 about pivot 16.

First hinge member 12 includes a plate-like body 79 having a motion slot 80 formed therein that is sized to accommodate pin 52 for movement therewithin and to limit the angular displacement of handle 46 in the first and second directions about main pivot 16. Thus, the pin and motion slot engagement limits the angular displacement of the second hinge member 14 relative to the first hinge member 12 during a single manipulation of handle 46. The angular position of second hinge member 14 can be further adjusted by returning the handle to its neutral position and then again rotating the handle in the desired direction whereupon the respective toothed segments of the pawl lever will reengage and further rotate the toothed ring 76 about pivot 16. Finally, handle spring 58 also urges the handle 46 to its neutral position through engagement of the spring legs 82 with pin 52.

Figure 6:
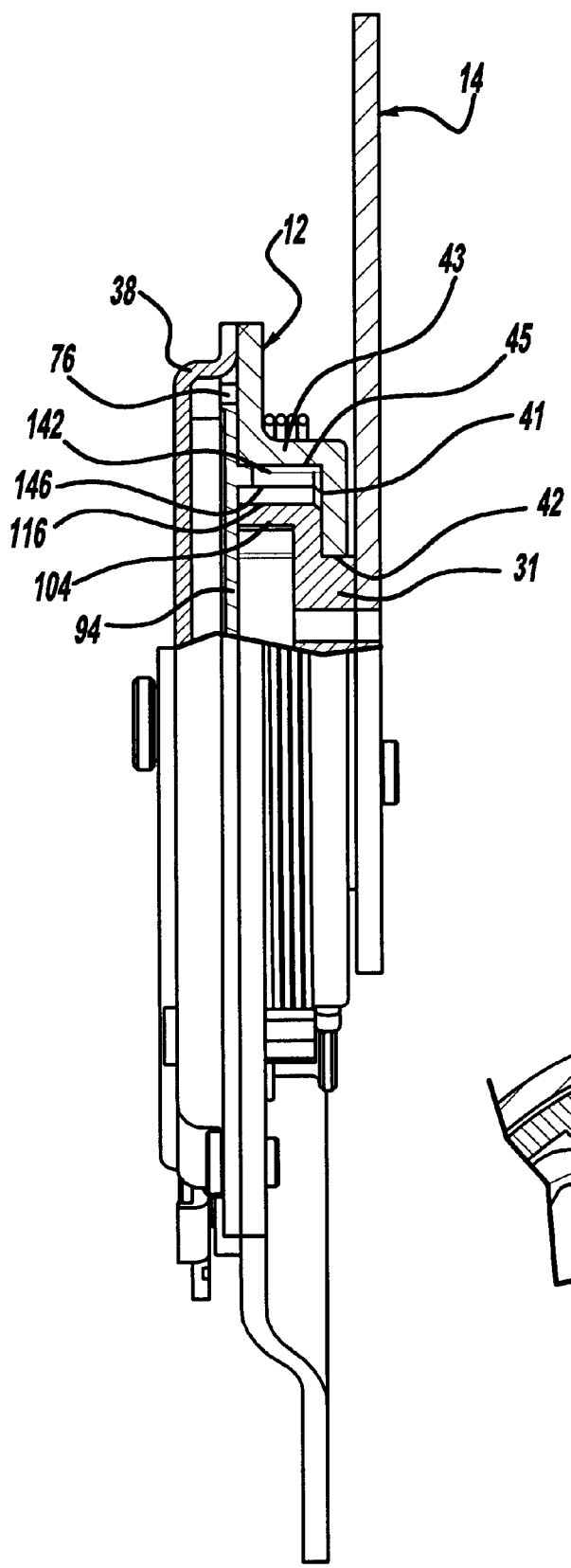
FIG. 6 is an elevational view of the assembled hinge assembly that is partially sectioned along the line 6—6 illustrated in FIG. 1.

First hinge member 12 also includes an abutment face 41 (FIG. 2) recessed from body 79 and having a circular aperture 42 formed therein to accommodate a cylindrical projection 31 on hub 30 (FIG. 6). A cylindrical sleeve 43 integrally connects abutment face 41 with first hinge member body 79 to define a cavity 44. Cylindrical sleeve 43 defines an inner bearing surface 45 (FIG. 6) configured to cooperate with the locking assembly 36 as hereinafter described.

Figure 5:
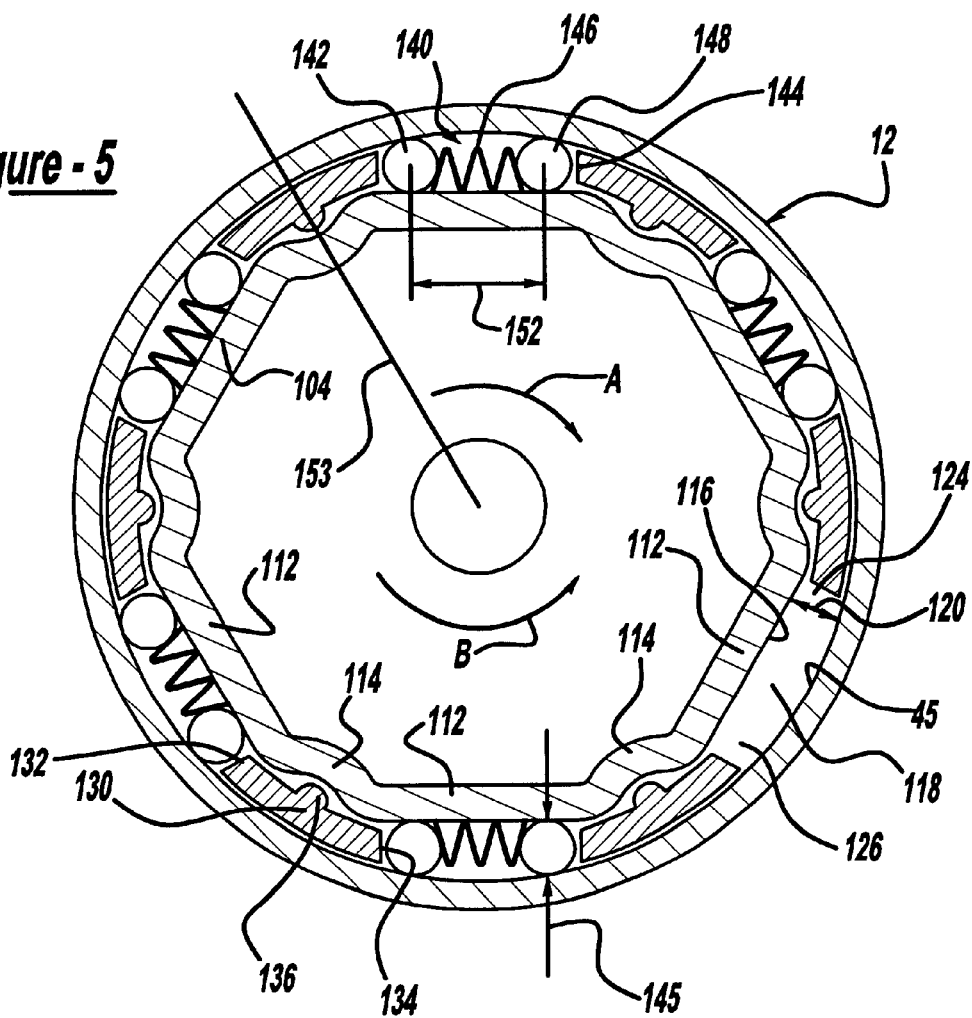
FIG. 5 is a partial sectional view of the hinge assembly with the locking assembly thereof in its neutral mode.
Figure 7:
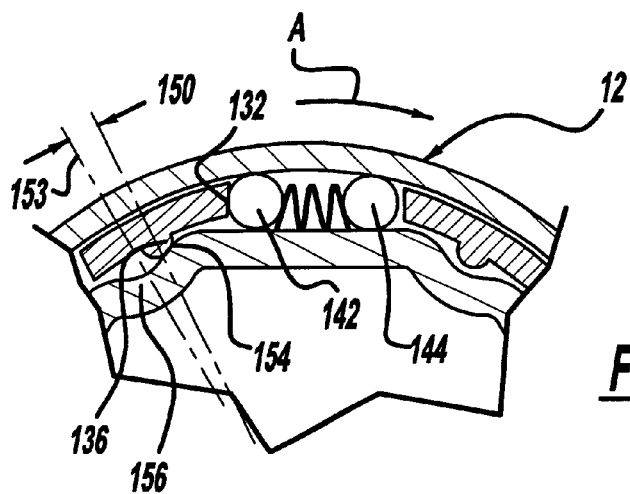
FIG. 7 is an enlarged view similar to that shown in FIG. 5 illustrating the locking assembly in its first adjusting mode.

To accommodate the respective movement of the drum 32 and hub 30 relative to the first and second hinge members, drum 32 includes a central plate 94 having an aperture 98 formed therein to accommodate pivot 16 (FIG. 2). Similarly, hub 30 includes a central segment 102 integral with an annular flange 104 that is configured to be disposable within the cavity 44 defined by first hinge member 12 as shown in FIGS. 5 and 6. Central segment 102 includes a central aperture 106 accommodating pivot 16 and a plurality of mounting apertures 108 sized to accommodate rivets 110 to couple hub 30 for rotation with second hinge member 14.

As is most clearly illustrated in FIG. 5, annular flange 104 of hub 30 includes a plurality of circumferentially spaced chord segments 112 separated by arcuate recessed segments 114. Hub 30 is disposed within the cavity 44 formed by first hinge member 12 such that the bearing surface 45 of first hinge member 12 cooperates with the respective chordal faces 116 of hub 30 to define a plurality of annular lock unit cavities 118 each having a varying cavity height extending radially from chordal faces 116 to bearing surface 45.

It should be appreciated that due to the circular configuration of bearing surface 45 and linear configuration of chordal faces 116, the cavity height 120 of each lock unit cavity varies from a minimum at first and second cavity ends 124 and 126, respectively, to a maximum cavity height an equal distance between the first and second cavity ends. Finally, drum 32 includes a plurality of actuating tabs 130 each with a first end 131 integral with a collar 88 and a second end 133 integral with a support ring 90 (FIG. 2). The tabs are circumferentially separated from one another by locked passages 92 and spaced to be centered relative to recessed segments 114 of hub 30 when the locking assembly is in its neutral mode. Each of tabs 130 include first and second cam surfaces 132 and 134 on rotationally leading faces thereof and a radially extending coupling rib 136.

The constant engagement feature of the present invention is provided in part by the locking assembly 36 which, as best illustrated in FIG. 5, includes a plurality of lock units 140 each having first and second cylindrical rollers 142 and 144 inter-coupled by an extension spring 146 that exerts a biasing force along a spring axis 148 to urge the first and second rollers away from one another. Each of the first and second rollers 142 and 144 have a diameter that defines an outer cylindrical surface having a uniform roller height 145 that is no less than the minimum cavity height at the first and second cavity ends 124 and 126 as described above. More particularly, the roller height 145 is preferably slightly larger than the minimum cavity height such that the first and second rollers each engage the chordal face and arcuate segments of the inner bearing surface 45 of first hinge member 12 when the locking assembly is in its neutral mode as illustrated in FIGS. 5 and 6. In this configuration, any forces tending to rotate second member 14, and therefore hub 30, about pin 16 are resisted by the wedged engagement of one of the first and second rollers 142 and 144 between the respective arcuate segments of bearing surface 45 and the chordal face 116. It is particularly preferred that the roller heights are such that the rollers engage the bearing surface 45 and chordal faces 116, are separated by predetermined separation distance 152, and contact one of the first and second cam surfaces of the adjacent radial tabs 130 when the locking assembly is in its neutral mode. It should be appreciated that the plurality of peripherally spaced lock units prevent rotation of hub 30 relative to first hinge member 12 when the locking assembly is in its neutral mode and the handle assembly is in its neutral position. Due to the fixed coupling of hub 30 to second hinge member 14, the locking assembly prevents inadvertent or unanticipated movement of second hinge member 14 about pivot 16 and, therefore, in the preferred embodiment, seatback 24 relative to seat bottom 22. Moreover, the respective positions of the lock units and the drum tabs 130, under the biasing force of extension spring 146, assist in reducing chucking or vibrational movement between the drum and hub. To further assist in preventing differential movement of the drum relative to the hub or other members of the hinge assembly, the hinge assembly includes an idler gear 154 that guides rotation of drum 32 about pivot 16 through a toothed engagement with ring 76.

The selective adjustment of the angular position of second hinge member 14 relative to first hinge member 12 will now be described. It should first be appreciated that the wedged engagement of each of the first rollers 142 between bearing surface 45 and chordal face 116 prevents rotation of hub 30 in the second direction "B" when the locking assembly is in its neutral mode. Similarly, the wedged engagement of each of the second rollers 144 between the chordal faces 116 and bearing surface 45 prevents rotation of hub 30 in the first direction "A" when the locking assembly is in its neutral mode. When the handle is rotated in the first direction "A", first toothed segment 72 engages toothed ring 76 (FIG. 3) and rotates drum 32 in the first direction. Such rotation, as is illustrated most clearly in FIG. 7, causes first cam surface 132 to engage and move first rollers 142 toward second rollers 144 thereby decreasing the separation distance therebetween to a magnitude less than separation distance 152 and allowing rotation of hub 30 relative to first hinge member 12 in the first direction. Upon further movement of handle 46, drum 32 rotates relative to hub 30 a first distance 150 from its neutral angular position 153 until coupling rib 136 engages a recessed face 154 of first recessed segment 156 to define the recline actuated position. Continued rotation of drum 32 past this recline actuated position causes drum 32 to rotate hub 30, and therefore second hinge member 14, relative to first hinge member 12 in the first direction to recline the seatback. It should further be appreciated that second rollers 144 remain generally stationary relative to hub 30 when drum 32 is rotated in first direction "A" as the constant radius of bearing surface 45 maintains the constant cavity height at the location of second rollers 144. Thus, second rollers 144 continue to prevent rotation of hub 30 in its second direction "B" when the handle, drum, and/or hub are rotated in the first direction "A".

Figure 8:
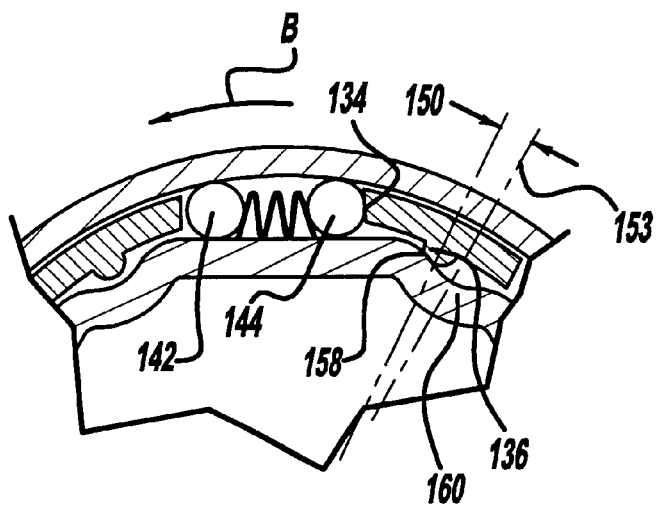
FIG 8 is an enlarged view similar to that shown in FIG. 5 illustrating the locking assembly in its second adjusting mode.

In a substantially identical manner as is illustrated in FIG. 8, when the handle 46 is rotated in the second direction "B", second toothed segment 74 engages toothed ring 76 (FIG. 4) and rotates drum 32 in the second direction. Such rotation, as is illustrated most clearly in FIG. 8, causes second cam surface 134 to engage and move second rollers 144 toward first rollers 142 thereby decreasing the separation distance therebetween to a magnitude less than separation distance 152 and allowing rotation of hub 30 relative to first hinge member 12 in the second direction "B". Upon further movement of handle 146, drum 32 rotates relative to hub 30, first distance 150 from its neutral angular position 153 until coupling rib 136 engages a recessed face 158 of recessed segment 160 to define the upright actuated position. Continued rotation of drum 32 past this upright actuated position causes coupling rib 136 to rotate hub 30, and therefore second hinge member 14, relative to first hinge member 12 in the second direction. It should further be appreciated that first rollers 142 remain generally stationary relative to hub 30 when drum 32 is rotated in second direction "B" as the constant radius of bearing surface 45 maintains the constant cavity height at the location of first rollers 142. Thus, first rollers 142 continue to prevent rotation of hub 30 in its first direction "A" when the handle, drum, and/or hub are rotated in the second direction "B".

Figure 3:
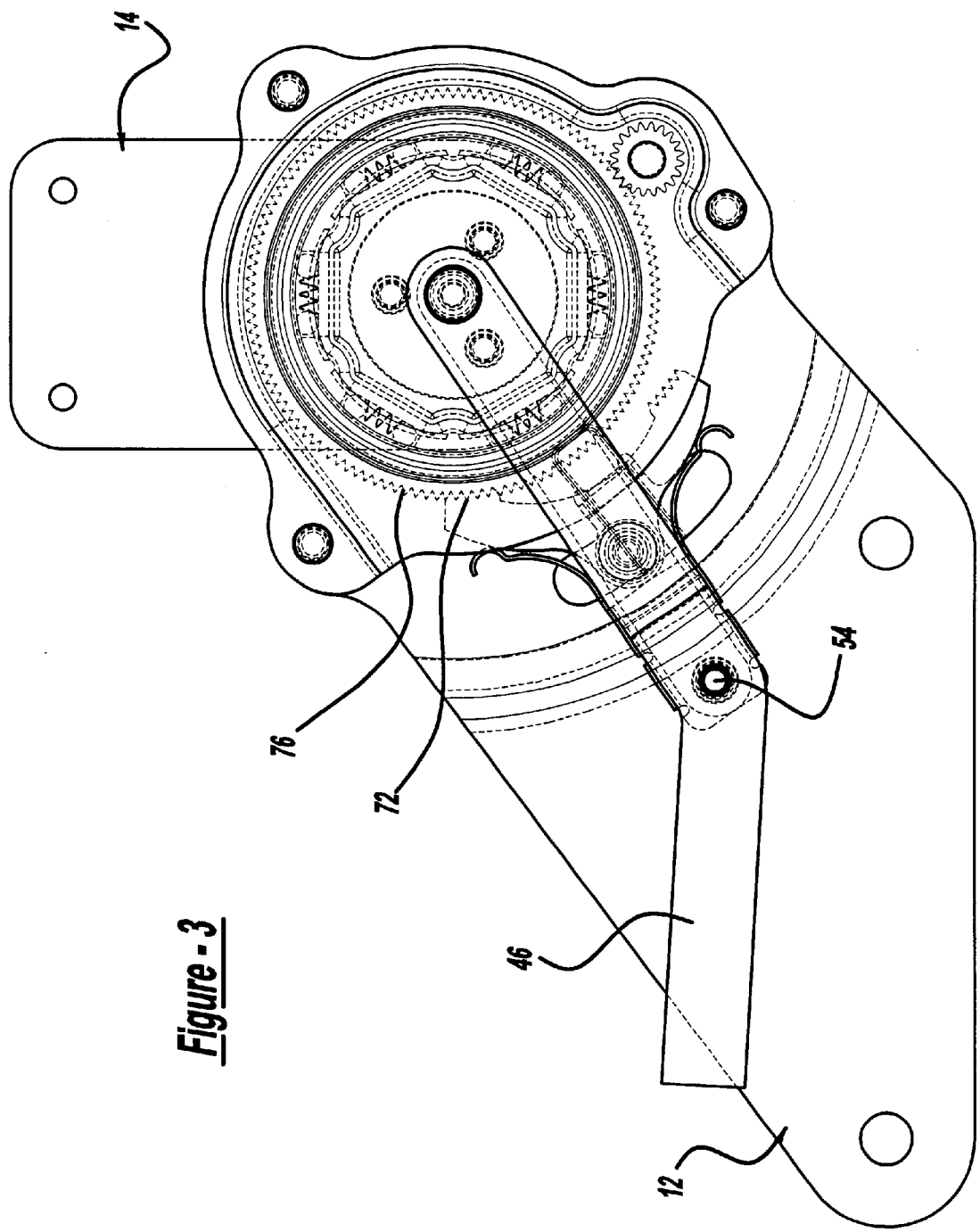
FIG. 3 is a side elevational view of the seat hinge assembly illustrated in FIG. 1 with the handle in its recline actuated position and the locking assembly in its first a ting mode.
Figure 4:
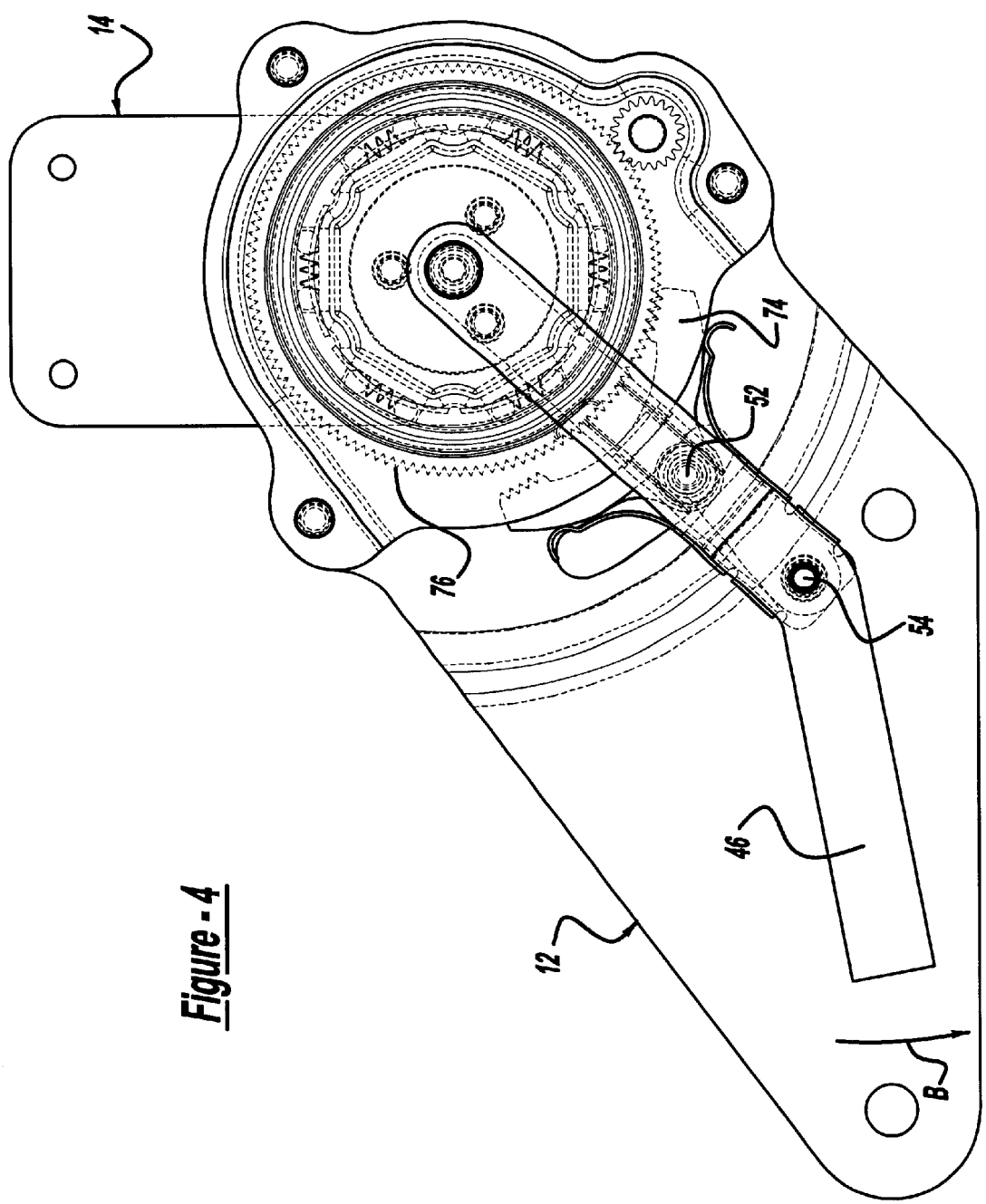
FIG. 4 is a side elevational view of the seat hinge assembly illustrated in FIG. 1 with the handle in its upright actuated position and the locking assembly in its second adjusting mode.

It should be appreciated that the incremental rotation of the second hinge member 14 relative to first hinge member 12 achievable through a single manipulation of actuator assembly 34 is limited by the disposition of pin 54 within slot 80 (FIGS. 1–3). Additional rotation of the second hinge member 14 is achievable by repeatedly returning the handle 46 to its neutral position and then reactuating the handle in its first or second directions.

It should be appreciated from this description, as well as the appended claims and drawings, the hinge assembly of the present invention includes a constant engagement infinite recliner mechanism that is normally operable in a fixed mode for establishing the angular position of the second hinge member relative to the first hinge member and operable in a reclining mode for adjusting the angular position of the seat hinge member relative to the first hinge member. The locking assembly of the constant engagement infinite recliner mechanism is operable in a neutral mode wherein the locking assembly prevents rotation of the hub in first and second rotational directions, a first engaged mode wherein the locking assembly allows rotation of the hub in the first direction and prevents rotation of the hub in the second direction, and a disengaged mode wherein the locking assembly allows rotation of the hub in the second direction while preventing rotation in the first direction. By the described structure and function of the present invention, the constant engagement infinite recliner provides a durable and cost effective constant engagement lockout assembly within a recliner mechanism. Thus, the constant engagement infinite recliner prevents undesirable and unanticipated movement of a seatback relative to the seat bottom while allowing selective movement of the seatback through manipulation of a handle assembly. The operator manipulation of the handle assembly govern the rate at which the seatback is rotated relative to the seat bottom regardless of the presence of inertial forces due to sudden acceleration or deceleration of the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hinge assembly for use with a seat having a seat back and a seat bottom comprising:
    a first hinge member adapted to be connected to one of the seat back and the seat bottom, said first hinge member including a cylindrical bearing surface defining a cavity;
    a second hinge member adapted to be connected to the other of the seat back and seat bottom and to said first hinge member for rotation relative thereto;
    a reclining mechanism normally operable in a fixed mode for establishing the angular position of the second hinge member relative to the first hinge member and operable in a reclining mode for adjusting the angular position of the second hinge member relative to the first hinge member, said reclining mechanism including:
        a hub fixed for rotation with said second hinge member;
        a locking assembly operable in a neutral mode wherein said locking assembly prevents rotation of said hub relative to said first hinge member, operable in a first adjusting mode wherein said locking assembly allows rotation of said hub relative to said first hinge member in a first direction and prevents rotation of said hub relative to said first hinge member in a second direction opposite said first direction, and operable in a second adjusting mode wherein said locking assembly allows rotation of said hub relative to said first member in said second direction and prevents rotation of said hub relative to said first hinge member in said first direction,
        an actuator assembly coupled to said first hinge member for movement between a neutral position, a recline actuated position, and an upright actuated position,
        a drum rotatable relative to said first and second hinge members and operatively coupled to said actuator assembly and said locking assembly to move said locking assembly into said first adjusting mode when said actuator assembly is moved into said recline actuated position and into said second adjusting mode when said actuator assembly is moved into said upright actuated position, and
        a spring biasing said actuator assembly into said neutral position.

2. The hinge assembly of claim 1 wherein said drum moves said locking assembly into said first adjusting mode and couples said hub for rotation with said drum in said first direction when said drum is rotated a first distance in said first direction and wherein said drum moves said locking assembly into said second adjusting mode and couples said hub for rotation with said drum in said second direction when said drum is rotated a second distance in said second direction.

3. The hinge assembly of claim 2 wherein rotation of said drum beyond said first distance in said first direction rotates said hub in said first direction to change the angular position of said second hinge member relative to said first hinge member and wherein rotation of said drum beyond said second distance in said second direction rotates said hub in said second direction to change the angular position of second hinge member relative to said first hinge member.

4. The hinge assembly of claim 3 wherein said first distance equals said second distance.

5. The hinge assembly of claim 3 wherein said actuator assembly includes a handle coupled to said drum to rotate said drum in said first direction when said handle is moved from said neutral position past said recline actuated position and to rotate said drum in said second direction when said handle is moved from said neutral position past said upright actuated position.

6. The hinge assembly of claim 5 wherein said drum includes a toothed ring and said handle includes a first pawl and a second pawl, said first and second pawl being out of engagement with said drum when said handle is in said neutral position, said first pawl engaging said toothed ring to rotate said drum in said first direction when said handle is moved from said neutral position to said recline actuated position, said second pawl engaging said toothed ring to rotate said drum in said second direction when said handle is moved from said neutral position to said upright actuated position.

7. The hinge assembly of claim 3 wherein said locking assembly includes a lock unit having a first roller, a second roller, and a spring with an axis, said spring coupled to said first and second rollers to exert a biasing force urging said first and second rollers away from one another, said first roller being separated from said second roller by a separation distance when said locking assembly is in said neutral mode, said first roller being separated from said second roller a distance less than said separation distance when said locking assembly is in one of said first or second adjusting modes.

8. The hinge assembly of claim 7 wherein said hub includes an outer chordal face, said hub disposed in said cavity wherein said bearing surface and said chordal face define a lock unit cavity therebetween, said lock unit disposed in said lock unit cavity.

9. The hinge assembly of claim 8 wherein said lock unit cavity includes a first end, a second end and a cavity height that varies from a minimum height at one of said first and second cavity ends and a maximum height between said first and second cavity ends, said first and second rollers each having a height no less than said minimum cavity height.

10. The hinge assembly of claim 9 wherein said second roller engages said chordal face and said bearing surface to prevent rotation of said hub relative to said first hinge member opposite said first direction when said locking assembly is in said neutral and first adjusting modes, wherein said first roller engages said chordal face and said bearing surface to prevent rotation of said hub relative to said first hinge member in said first direction when said locking assembly is in said neutral and second adjusting modes.

11. The hinge assembly of claim 10 wherein said drum further includes a first cam surface engageable with said first roller to move said first roller toward said second roller and out of engagement with said bearing surface when said drum is rotated said first distance thereby allowing rotation of said hub relative to said first hinge member in said first direction, and wherein said drum includes a second cam surface engageable with said second roller to move said second roller toward said first roller and out of engagement with said bearing surface when said drum is rotated said second distance thereby allowing rotation of said hub relative to said first hinge member in said second direction.

12. The hinge assembly of claim 11 wherein said drum further includes a coupling rib engageable with said hub when said drum is rotated one of said first or second distance and to rotate said hub with said drum when said drum is rotated beyond one of said first or second distances.

13. The hinge assembly of claim 12 wherein said drum includes a first tab defining said first cam surface and said coupling rib.

14. The hinge assembly of claim 13 wherein said hub includes a first recess and a second recess, said chordal face being between said first and second recesses, said drum including a second tab spaced from said first tab to define an arcuate segment therebetween, said first tab being disposed in said first recess and said second tab being disposed in said second recess when said locking assembly is in said neutral mode.

15. The hinge assembly of claim 14 wherein said locking assembly includes a plurality of lock units and lock unit cavities circumferentially spaced about said hub.

16. A vehicle seat comprising:
  a seat bottom;
  a seatback supported for pivotal movement relative to said seat bottom;
  a hinge assembly including a first hinge member fixed to one of said seat bottom or seatback, a second hinge member fixed to the other of said seat bottom or seatback and coupled to said first hinge member for rotation about a pivot in a first direction and a second direction, said first hinge member including a cylindrical bearing surface defining a cavity, said hinge assembly further including a reclining mechanism normally operable in a fixed mode for establishing the angular position of the seat back relative to the seat bottom and operable in a reclining mode for adjusting the angular position of the seat back relative to the seat bottom, said reclining mechanism including:
    a hub fixed for rotation with said second hinge member,
    a locking assembly operable in a neutral mode when said reclining mechanism is in said fixed mode and wherein said locking assembly prevents rotation of said hub relative to said first hinge member, said locking assembly being further operable in a first adjusting mode or a second disengaged mode when said reclining mechanism is in said reclining mode, said locking assembly allowing rotation of said hub relative to said first hinge member in a first direction and preventing rotation of said hub relative to said first hinge member in a second direction opposite said first direction when said locking assembly is in said first adjusting mode, said locking assembly allowing rotation of said hub relative to said first member in said second direction and preventing rotation of said hub relative to said first hinge member in said first direction when said locking assembly is in said second adjusting mode,
    an actuator assembly coupled to said first hinge member for movement between a neutral position, a recline actuated position, and an upright actuated position,
    a drum rotatable relative to said first and second hinge members and operatively coupled to said actuator assembly and said locking assembly to move said locking assembly into said first adjusting mode when said actuator assembly is moved into said recline actuated position and into said second adjusting mode when said actuator assembly is moved into said upright actuated position, and
    a spring biasing said actuator assembly into said neutral position.

17. The vehicle seat of claim 16 wherein said drum moves said locking assembly into said first adjusting mode and couples said hub for rotation with said drum in said first direction when said drum is rotated a first distance in said first direction and wherein said drum moves said locking assembly into said second adjusting mode and couples said hub for rotation with said drum in said second direction when said drum is rotated a second distance in said second direction.

18. The vehicle seat of claim 17 wherein rotation of said drum beyond said first distance in said first direction rotates said hub in said first direction to change the angular position of said second hinge member relative to said first hinge member and wherein rotation of said drum beyond said second distance in said second direction rotates said hub in said second direction to change the angular position of second hinge member relative to said first hinge member.

19. The vehicle seat of claim 18 wherein said first distance equals said second distance.

20. The vehicle seat of claim 18 wherein said actuator assembly includes a handle coupled to said drum to rotate said drum in said first direction when said handle is moved from said neutral position past said recline actuated position and to rotate said drum in said second direction when said handle is moved from said neutral position past said upright actuated position.

21. The vehicle seat of claim 20 wherein said drum includes a toothed ring and said handle includes a first pawl and a second pawl, said first and second pawl being out of engagement with said drum when said handle is in said neutral position, said first pawl engaging said toothed ring to rotate said drum in said first direction when said handle is moved from said neutral position to said recline actuated position, said second pawl engaging said toothed ring to rotate said drum in said second direction when said handle is moved from said neutral position to said upright actuated position.

22. The vehicle seat of claim 18 wherein said locking assembly includes a lock unit having a first roller, a second roller, and a spring with an axis, said spring coupled to said first and second rollers to exert a biasing force urging said first and second rollers away from one another, said first roller being separated from said second roller by a separation distance when said locking assembly is in said neutral mode, said first roller being separated from said second roller a distance less than said separation distance when said locking assembly is in one of said first or second adjusting modes.

23. The vehicle seat of claim 22 wherein said hub includes an outer chordal face, said hub disposed in said cavity wherein said bearing surface and said chordal face define a lock unit cavity therebetween, said lock unit disposed in said lock unit cavity.

24. The vehicle seat of claim 23 wherein said lock unit cavity includes a first end, a second end and a cavity height that varies from a minimum height at one of said first and second cavity ends and a maximum height between said first and second cavity ends, said first and second rollers each having a height no less than said minimum cavity height.

25. The vehicle seat of claim 24 wherein said second roller engages said chordal face and said bearing surface to prevent rotation of said hub relative to said first hinge member opposite said first direction when said locking assembly is in said neutral and first adjusting modes, wherein said first roller engages said chordal face and said bearing surface to prevent rotation of said hub relative to said first hinge member in said first direction when said locking assembly is in said neutral and second adjusting modes.

26. The vehicle seat of claim 25 wherein said drum further includes a first cam surface engageable with said first roller to move said first roller toward said second roller and out of engagement with said bearing surface when said drum is rotated said first distance thereby allowing rotation of said hub relative to said first hinge member in said first direction, and wherein said drum includes a second cam surface engageable with said second roller to move said second roller toward said first roller and out of engagement with said bearing surface when said drum is rotated said second distance thereby allowing rotation of said hub relative to said first hinge member in said second direction.

27. The vehicle seat of claim 26 wherein said drum further includes a coupling rib engageable with said hub when said drum is rotated one of said first or second distance and to rotate said hub with said drum when said drum is rotated beyond one of said first or second distances.

28. The vehicle seat of claim 27 wherein said drum includes a first tab defining said first cam surface and said coupling rib.

29. The vehicle seat of claim 28 wherein said hub includes a first recess and a second recess, said chordal face being between said first and second recesses, said drum including a second tab spaced from said first tab to define an arcuate segment therebetween, said first tab being disposed in said first recess and said second tab being disposed in said second recess when said locking assembly is in said neutral mode.

30. The vehicle seat of claim 29 wherein said locking assembly includes a plurality of lock units and lock unit cavities circumferentially spaced about said hub.

* * * * *